(12) United States Patent
Bhalla et al.

(10) Patent No.: US 10,116,806 B2
(45) Date of Patent: Oct. 30, 2018

(54) BANDWIDTH AWARE NETWORK STATISTICS COLLECTION

(71) Applicant: Qualcomm Innovation Center, Inc., San Diego, CA (US)

(72) Inventors: Vaibhav Bhalla, Bengaluru (IN); Nikhil Kumar Kansal, Hyderabad (IN)

(73) Assignee: QUALCOMM Innovation Center, Inc., San Diego, CA (US)

(*) Notice: Subject to any disclaimer, the term of this patent is extended or adjusted under 35 U.S.C. 154(b) by 128 days.

(21) Appl. No.: 15/272,135

(22) Filed: Sep. 21, 2016

(65) Prior Publication Data
US 2017/0346955 A1 Nov. 30, 2017

Related U.S. Application Data

(60) Provisional application No. 62/342,058, filed on May 26, 2016.

(51) Int. Cl.
*H04M 15/30* (2006.01)
*H04W 24/02* (2009.01)
*H04M 15/00* (2006.01)

(52) U.S. Cl.
CPC .......... *H04M 15/30* (2013.01); *H04M 15/39* (2013.01); *H04M 15/58* (2013.01); *H04M 15/8214* (2013.01); *H04M 15/852* (2013.01); *H04W 24/02* (2013.01)

(58) Field of Classification Search
CPC .... H04L 1/0007; H04W 24/02; H04B 7/0452; H04M 15/30; H04M 15/39; H04M 15/58; H04M 15/8214
See application file for complete search history.

(56) References Cited

U.S. PATENT DOCUMENTS

| 6,820,117 | B1* | 11/2004 | Johnson | H04L 47/10 370/468 |
| 2008/0222021 | A1* | 9/2008 | Stanforth | G06Q 10/063 705/37 |
| 2013/0272129 | A1* | 10/2013 | Prakash | H04W 28/0221 370/235 |
| 2013/0335509 | A1* | 12/2013 | Cafferata | G06Q 30/02 348/14.08 |
| 2014/0219110 | A1* | 8/2014 | Du | H04L 1/0007 370/252 |
| 2015/0244820 | A1* | 8/2015 | Verkasalo | H04L 67/22 707/740 |
| 2017/0325286 | A1* | 11/2017 | Le | H04W 92/02 |

* cited by examiner

*Primary Examiner* — Nizar Sivji
(74) *Attorney, Agent, or Firm* — Neugeboren O'Dowd PC

(57) ABSTRACT

Herein disclosed are systems, methods, and apparatus for controlling data usage statistics in network-connected devices. The 'stats' collection can be suppressed during minimum window periods, thereby reducing CPU and resources usage needed to processes the stats collection. Further, the minimum window can be a function of a link speed of the communication channel as well as a data usage proximity to a data usage warning limit. Further, stats collection can be triggered by expiration of a timer or data usage that meets a buffer threshold, where both the timer and threshold are selected based on the communication channel link speed, and buffer threshold is further a function of the data usage proximity to the warning limit.

12 Claims, 17 Drawing Sheets

Default stats collection causes frequent CPU scaling and thus poor performance and large power consumption Inventive stats collection leads to less frequent CPU scaling and thus better performance and lower power consumption

BANDWIDTH AWARE NETWORK STATISTICS COLLECTION

CROSS REFERENCE TO RELATED APPLICATIONS

The present application for patent claims priority to Provisional Application No. 62/342,058 entitled "Bandwidth Aware Network Statistics Collection" filed May 26, 2016, and assigned to the assignee hereof and hereby expressly incorporated by reference herein.

BACKGROUND

Field of the Disclosure

The present invention relates to network communication in computing devices. In particular, but not by way of limitation, the present invention relates to collecting network status information for controlling data usage limits that various applications and device features may rely on.

Description of Related Art

Computing devices, such as smart phones, netbooks, and tablets, which utilize network connections, are now pervasive. And many of these devices may communicate via multiple communication protocols corresponding, for example, to WiFi, and a variety of different cellular communication schemes.

In many instances it is useful for the user of these devices to track network utilization. In the context of ANDROID-based devices, a "network stats service" is available, which collects the data transfer from different communication channels (e.g., WiFi and cellular data). But this service computes the data frequently and provides stats frequently whether the amount of data transferred is close or far from a data usage warning limit (hereinafter "warning limit"). These frequent stats computations cause frequent file writes and adversely affect power and performance. Moreover, the network stats service provides far more information than is needed to compare data transfer to the warning limit.

FIG. 1 illustrates a method of tracking data transfer on a computing device and notifying the user when the data transfer exceeds a warning limit. The stats collection can be triggered by either expiration of a timer (e.g., 30 sec) or a level of data transfer (e.g., 10 Mb), both of which can be reset when either is reached. So, the method 100 can start by setting the timer (Block 108) and setting a buffer limit (Block 110). The buffer can then be registered (Block 112) and thereby begin tracking data usage and comparing the data usage to a buffer threshold. At the same time, the timer starts and waits to expire (Block 112). The timer can start and the buffer can register at the same time, and both can be triggered by stats collection. When either the timer expires or the buffer threshold is met (i.e., the user has used a certain amount of data) (Decision 114), the timer can be cancelled (Block 118) and the collection of stats is triggered (Block 120). The data usage collected during the stats collection can be compared to the data usage warning limit (Decision 122) and a user can be notified (Block 124) if the warning limit has been reached. If not (Decision 122), then the method 100 can reset the timer and buffer (Blocks 108 and 110) and both can begin again (Block 112).

The timer is preferably fixed while the buffer threshold can be a function of a distance from the data usage warning limit.

Previous attempts to solve this problem have focused on reductions in the numbers of stats collection instances, but to the detriment of the accuracy of identifying data usage warning limits. For instance, triggers for stats collection can be increased such that stats collection occurs less often, however this means that accuracy of identifying the warning limit decreases. Prior attempts did not analyze whether the link speed might affect stats collection, let alone take any steps to tie data link speed to the control of stats collection. The assumption has long been that network stats should be unaffected by link speed.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Applications may rely upon data usage statistics (hereinafter "stats") to monitor an amount of data transferred over a given communication channel and compare this to warning limits to prevent excessive usage. As noted above, existing methods for monitoring data usage perform far more instances of data usage stats collection (hereinafter "stats collection") than is necessary to compare to a warning limit and therefore the prior art stats collection consumes excessive power and hampers device performance. To overcome these and the problems noted above, this disclosure describes partially suppressing the prior art stats collection—instead performing stats collection after a minimum window has elapsed, and before a next minimum window begins (e.g., during a period when a minimum window is not being enforced). This effectively increases the polling period for stats collection, thereby avoiding many of the unnecessary and resource-consuming stats collection instances.

One aspect of the disclosure can be characterized as a method for controlling data usage statistics in network-connected devices, the method including suppressing triggering data usage stats collection during a minimum window. The method can also include performing at least one instance of a data usage stats collection after termination of the minimum window. The method may also include, incrementally decreasing the minimum window as data usage approaches the warning limit, if the data usage stats show that a warning limit has not been met or exceeded.

Another aspect of the disclosure can be characterized as a system for controlling data usage statistics in network-connected devices. The system can include a processing portion with one or more processing components therein. The system can also include a memory coupled to the processing portion. The system can yet further include a minimum window module stored on the memory and executable on the processing portion to: perform data usage stats collection between minimum windows; upon termination of a repeating timer or meeting of a data usage buffer threshold (hereinafter "buffer threshold") between enforcement of minimum windows, perform stats collection, wherein the timer restarts and the buffer threshold is restarted whenever either the timer expires or the buffer threshold is reached; if a data usage warning limit has been reached or exceeded, then generate a data usage warning; where, the minimum windows are a function of (1) a communication channel link speed, and (2) a proximity of data usage to the warning limit; and where the timer and the buffer threshold are functions of the communication channel link speed; and wherein the buffer threshold is a function of the proximity of the data usage to the warning limit.

Another aspect of the disclosure can be characterized as a non-transitory, tangible processor readable storage medium, encoded with processor executable code to perform a method for controlling data usage statistics in network-connected devices. The method including suppressing triggering data usage stats collection during a minimum window. The method can also include performing at least one instance of a data usage stats collection after termination of the minimum window. The method may also include, incrementally decreasing the minimum window as data usage approaches the warning limit, if the data usage stats show that a warning limit has not been met or exceeded

DETAILED DESCRIPTION

Figure 1:
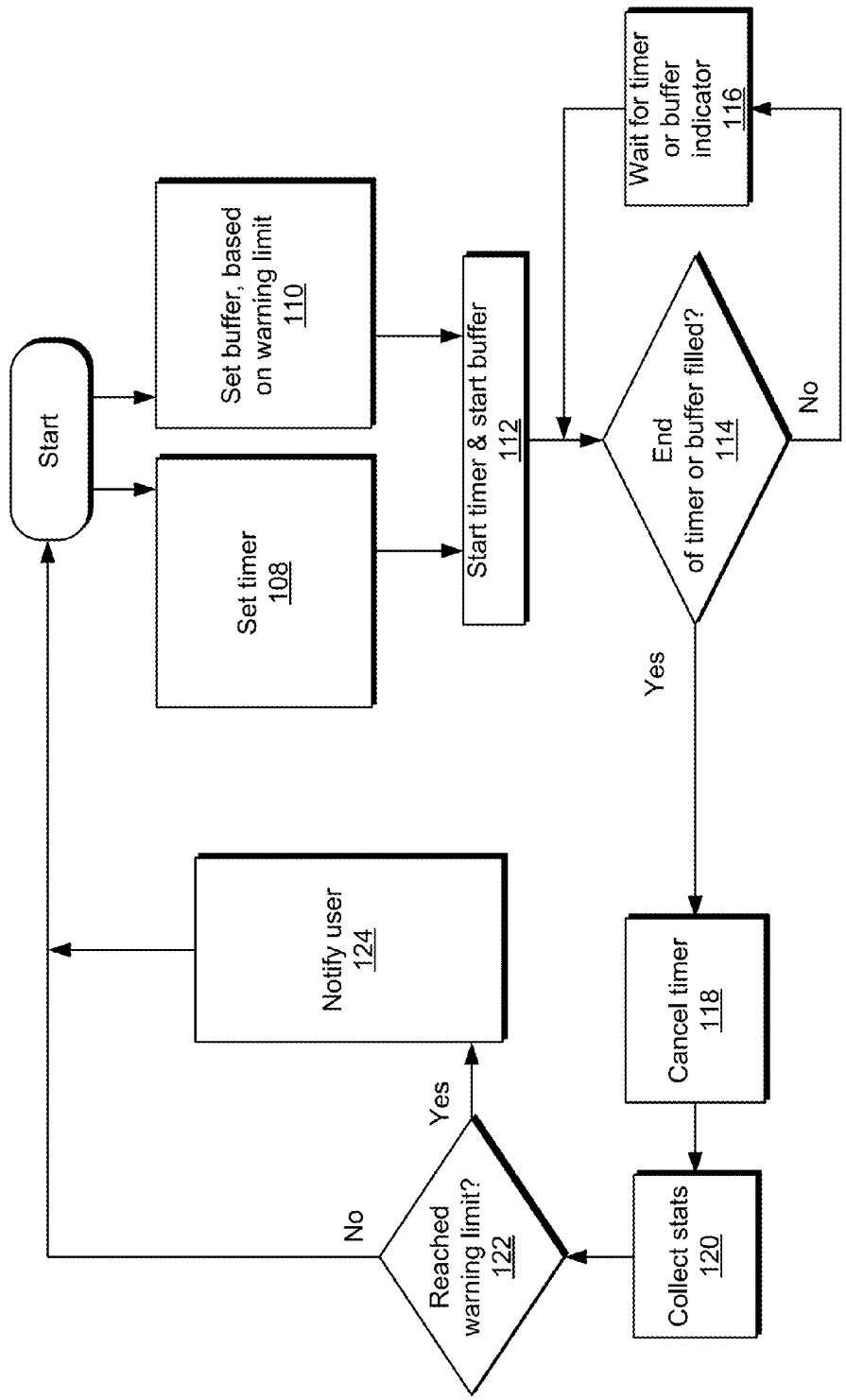
FIG. 1 illustrates a method of tracking data transfer on a computing device and notifying the user when the data transfer exceeds a warning limit.

For the purposes of this disclosure, a "link speed" is a maximum data transfer rate for a communication channel. For instance, the link speed of a CAT6 connection is often higher than the actual data transfer rate since CAT6 is capable of multiple data speeds, high, medium, and low. Similarly, bottlenecks, such as the capabilities of a network interface or of a network switch, can force actual data transfer rates to be lower than the potential maximum—lower than the link speed.

Applications may rely upon data usage statistics (hereinafter "stats") to monitor an amount of data transferred over a given communication channel and compare this to warning limits to prevent excessive usage. As noted above, existing methods for monitoring data usage perform far more instances of data usage stats collection (hereinafter "stats collection") than is necessary to compare to a warning limit and therefore the prior art stats collection consumes excessive power and hampers device performance. To overcome these and the problems noted above, this disclosure describes partially suppressing the prior art stats collection—instead performing stats collection after a minimum window has elapsed, and before a next minimum window begins (e.g., during a period when a minimum window is not being enforced). This effectively increases the polling period for stats collection, thereby avoiding many of the unnecessary and resource-consuming stats collection instances.

However, merely refraining from performing some scheduled stats collection instances can lead to too-granular of an approach to identifying excessive data usage, especially as the data usage approaches a warning limit. In other words, the minimum window can be so long that stats may occur prior to reaching the warning limit and a next instance may occur long after the warning limit has been reached, thus leading a user to learn of the warning limit long after he/she has surpassed it and started to incur the effects of surpassing a data usage limit (e.g., cellular carrier data overage fees)—one of the reasons that warning limits are used in the first place. To prevent such inaccurate identification of the warning limit, this disclosure not only provides a minimum window, but one that is reduced as a function of proximity to the warning limit, thereby leading to an increased number of stats collection instances as data usage approaches the warning limit. In one aspect, the minimum window can even be cancelled when data usage comes within a minimum window termination threshold from the warning limit, and from that threshold onward, all scheduled stats collection instances can be carried out (i.e., no further suppression of stats collection occurs once the minimum window termination threshold is reached). In other words, before the minimum window termination threshold, stats collection can be partially suppressed, and after the minimum window termination threshold, stats collection is not suppressed.

Another aspect of this disclosure, is that more than one warning limit can be set and monitored, for instance, a different warning limit for each of multiple communication channels (e.g., a WiFi communication channel may have a higher warning limit than a cellular communication channel), or two or more warning limits for each communication channel.

To better understand the details of this disclosure, those of skill in the art will recall that prior art stats collection is not so much periodic, but rather, triggered by either (1) expiration of a timer or (2) meeting a data transfer limit (e.g., a data usage buffer threshold or "buffer threshold"). For the purposes of this disclosure, suppression of stats collection can mean turning the timer and data transfer limit off during a minimum window, or letting the timer run and monitoring the data transfer limit, but not enabling either of these to trigger stats collection during the minimum window. Said another way, the timer and monitoring of the data transfer limit may only be carried out during, or may only trigger stats collection between, minimum windows (i.e., when a minimum window is not being enforced).

Another issue is that where the communication channel link speed changes or starts at an unexpected rate, the minimum window can be too long. To account for unexpected data rates, selection of the minimum window can also consider the communication channel link speed and the minimum window can be dynamically adjusted in real-time. Similarly, the timer-based trigger for stats collection can also be based on the communication channel link speed, whereas this timer is fixed in the prior art. What is more, the data transfer limit that triggers stats collection between minimum windows can also be based on the communication channel link speed, and further can be reduced as the data usage approaches the warning limit.

The result of these various improvements to the monitoring of warning limits is that far from the warning limit, significant power savings will be seen, while closer to the warning limit, less power will be saved, but the warning limit is more likely to be accurately identified.

Figure 2:
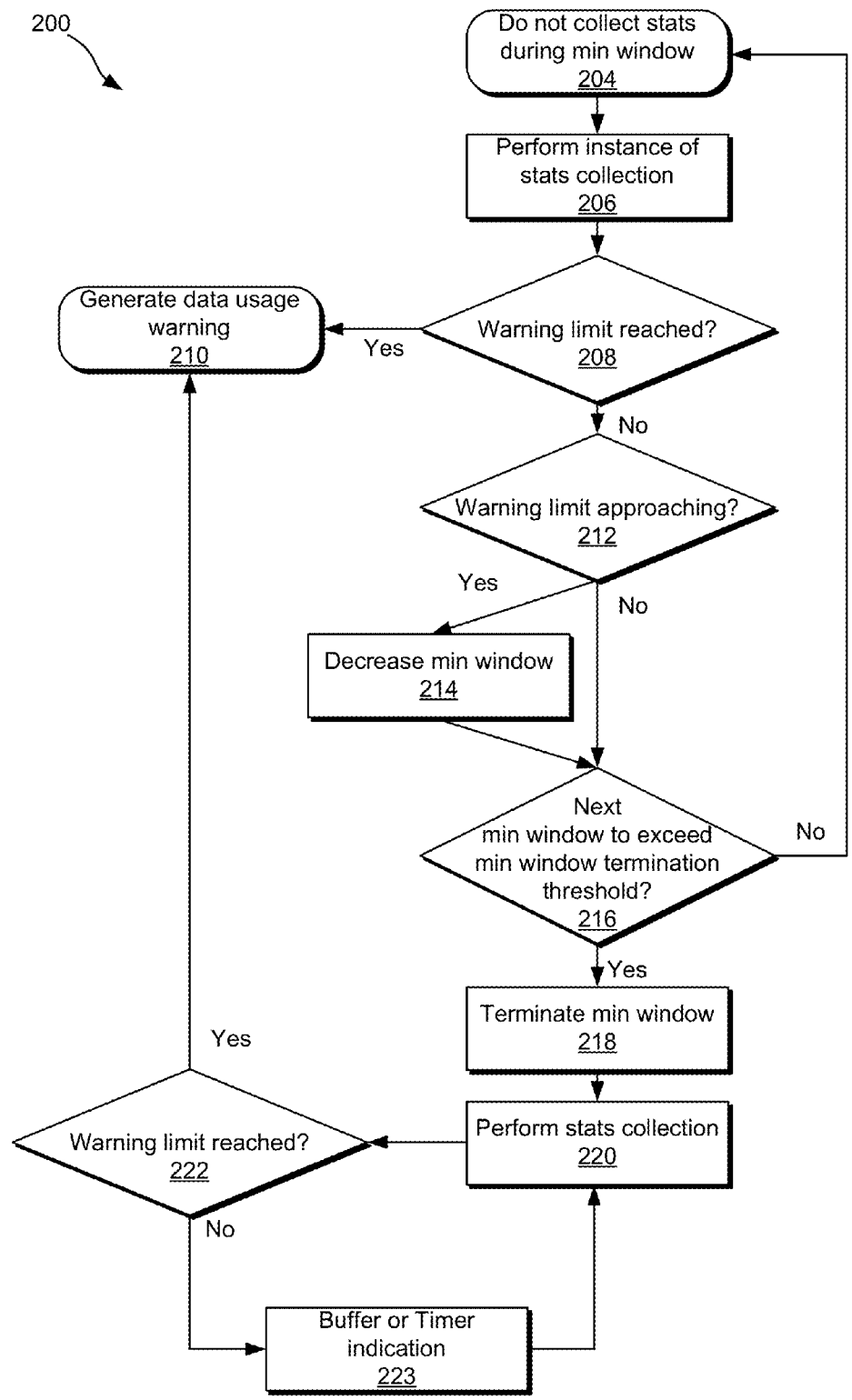
FIG. 2 illustrates one embodiment of a method for controlling stats collection.

FIG. 2 illustrates one embodiment of a method for controlling stats collection. This method 200 can at least partially be carried out via a modified network status module that is part of the ANDROID framework. It can use any operating system that exposes the operating system application programming interface (API) for network stats collection. In other words, the modified network stats module is a framework running atop an operating system. In particular, a minimum window module of the network stats module can carry out the method 200. A primary aspect of this method 200 is suppressing unnecessary stats collection. In particular, the method 200 can refrain from collecting stats during a minimum window (Block 204), where the length of the minimum window is a function of a communication channel link speed for the communication channel being monitored (e.g., a mobile device may have a communication channel for WiFi and another communication channel for cellular). During the minimum window, typical stats collection can be suppressed, and once each instance of the minimum window has completed, an instance of stats collection can be allowed to run (Block 206) and the data usage for the communication channel can be compared to the data usage warning limit (Decision 208). If the warning limit is reached or exceeded, then a data usage warning is generated (Block 210). If the limit is not reached (Decision 208), but the warning limit is approaching (Decision 212), then a next instance of the minimum window can be decreased (Block 214). Whether the next instance of the minimum window is decreased or not, maximum data transfer during a next instance of the minimum window can be compared to a minimum window termination threshold (Decision 216), and if the maximum data transfer possible in the next instance of the minimum window will not exceed the minimum window termination threshold, then the next minimum window can be started and stats collection can again be suppressed for this next instance of the minimum window (Block 204). This suppression of stats collection may continue as the data usage rises, eventually getting close enough to the warning limit that a maximum data transfer during a next instance of the minimum window meets or exceeds the minimum window termination threshold (Decision 216). At this point, the minimum window can be terminated or turned off (Block 218), and suppression of frequent stats collection can end. Stats collection can then be performed (Block 220) in line with traditional triggers (e.g., a repeating timer and repeated comparison of data usage to a buffer threshold (Block 223)) until the warning limit is reached (Decision 222). Once reached, a warning can be generated (Block 210) and presented to a user. In other words, stats collection can be suppressed when data usage is far from the warning limit, thereby conserving significant power, this suppression can be reduced as the data usage approaches the warning limit, and within a certain threshold of the warning limit, the suppression can be terminated, such that frequent stats collection instances can be carried out and thereby identify data usage more accurately just before the warning limit is reached.

While FIG. 2 has been described in terms of suppression of stats collection, in some embodiments, the timer and threshold that typically trigger stats collection can continue to operate during the minimum window, but within being able to trigger stats collection during the minimum window. In other words, they may only be allowed to trigger stats collection when the minimum window is not being enforced—between the end of one instance of the minimum window and a start of a next instance of the minimum window.

In other embodiments, the timer and buffer threshold that are used to trigger stats collection can be selected based on a communication channel link speed, and in the case of the buffer threshold, also based on a proximity to the warning limit. For instance, for increased communication channel link speed, the timer and buffer threshold can be increased. In an embodiment, even after the warning limit has been reached, stats can continue to be collected where the timer and buffer threshold are tailored to the communication channel link speed (although the buffer threshold may not also be based on a proximity to the warning limit, since the warning limit has already been reached). However, where a second warning limit, higher than the first warning limit, is implemented, the buffer threshold can be selected based on the communication channel link speed and a distance from the second warning limit.

Figure 3:
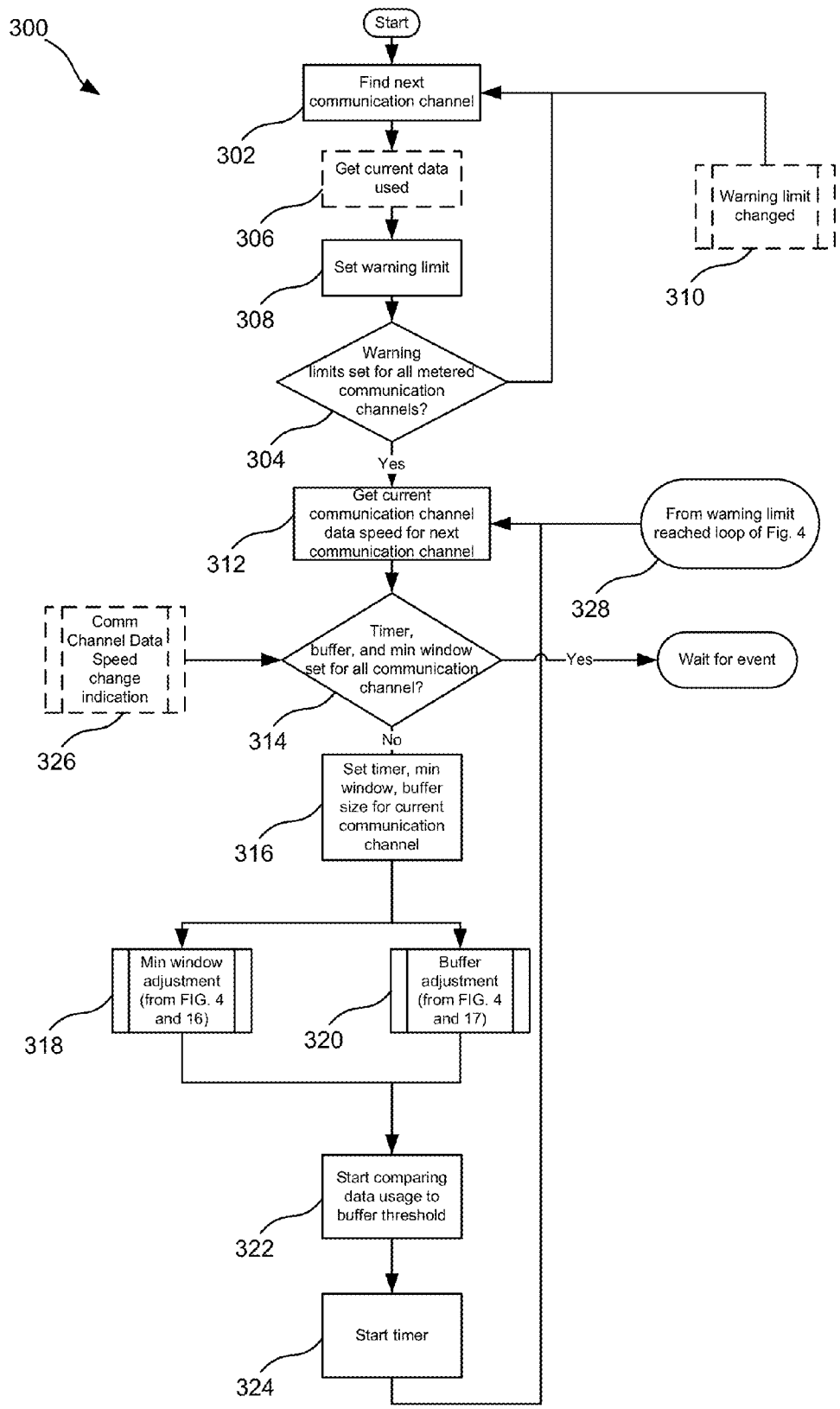
FIG. 3 illustrates a more detailed embodiment of a method for controlling stats collection.
Figure 4:
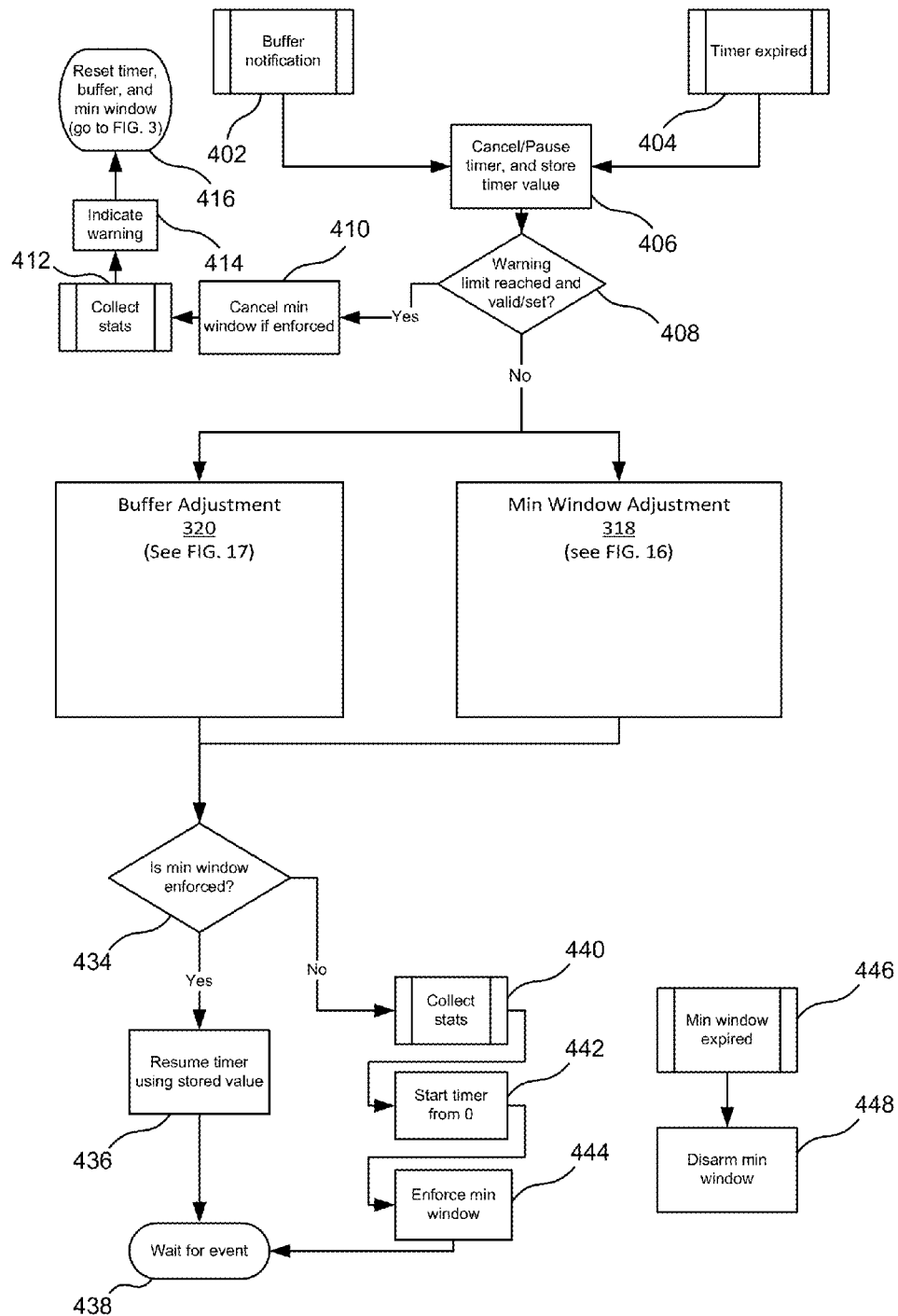
FIG. 4 illustrates a more detailed embodiment of a method for controlling stats collection.

FIGS. 3 and 4 illustrate a more detailed embodiment of a method for controlling stats collection. FIG. 3 generally describes configuration of the system, while FIG. 4 describes run-time operation. The method 300 can begin by setting warning limits for all communication channels. This may begin with finding a next communication channel 302 (i.e., the first communication channel when the method 300 begins), optionally obtaining a current data used for the selected communication channel (Block 306) (e.g., performing an instance of stats collection), and setting a corresponding warning limit (Block 308). For instance, a user who has a data cap of 6 GB per month for cellular data could set a warning limit of 5.5 GB for the cellular communication channel. In another example, a user may reboot a device, and the device will need to get previously-used data before setting the warning limit (optional Block 306). Some communication channels are not associated with warning limits, and so the Decision 304 only looks at metered communication channels. Blocks 306 and 308 are interchangeable in order.

Once all metered communication channels have been assigned a warning limit (Decision 304), the method 300 can access a current communication channel link speed for a next communication channel (Block 312), where this step is not limited to metered channels (since stats can be collected for more than just metered data channels). This can involve a GET command or similar method for accessing a link speed that may be embedded in packet headers or can be retrieved from a network interface, to name two non-limiting examples.

The method 300 can then determine if a timer, buffer threshold, and minimum window have been set for all communication channels (Decision 314). If they have, then the method 300 can start comparing data usage to a data usage buffer threshold (e.g., register the buffer with the kernel) (Block 322) and start the timer (Block 324). With these running, the method 300 can wait for runtime events that trigger stats collection (see FIG. 4). However, if the timer, buffer threshold, and minimum window have not all been set for all communication channels (decision 314), metered or not, then the method 300 can set the timer, buffer threshold, and minimum window for a currently-selected communication channel based on default values found in storage (Block 316). In some cases these can be fixed values, while in others, the timer, buffer threshold, and minimum window can be based on the communication channel link speed for the currently-selected communication channel. The timer, buffer threshold, and minimum window can have configurations that correspond to different communication channel link speeds for each communication channel. In other cases, these values can be dynamically related to communication channel link speed. In yet other cases, an equation with the communication channel link speed as one of its inputs can be used to determine the timer, buffer threshold, and minimum window. Setting the buffer threshold and the minimum window can also take into consideration a distance between the data that has been used and the warning limit for the selected communication channel. As the data usage approaches the warning limit, one or both of the buffer threshold and the minimum window can be reduced.

The Blocks 318 and 320 can then make adjustments to the minimum window and buffer threshold if appropriate. Details of these adjustments (e.g., calling a minimum window adjustment function or calling a buffer threshold adjustment function) can be found in FIGS. 16 and 17, respectively.

The method 300 can start tracking data usage and comparing this to the buffer threshold as well as start the timer (Blocks 322 and 324). Block 322 can include registering the buffer with the kernel, and the kernel then begins to track data transfer on the selected communication channel. This can also be referred to as buffer limit monitoring. Once the buffer limit or buffer threshold is reached, the kernel can inform the network status module, which can trigger stats collection. While this disclosure often uses the term "buffer," a physical buffer is not required, but rather any component that can track and indicate that a data transfer limit or threshold has been reached. Registration of the buffer is only needed when the buffer threshold changes. Otherwise, the monitoring of data usage relative to the buffer threshold can merely be restarted.

The method 300 can get a communication channel link speed for a next communication channel and this can continue until the timer, buffer threshold, and minimum window are set for all communication channels—metered or non-metered. Initialization can be considered complete, and the method 300 can shift to waiting for runtime events in FIG. 4.

If at any time during initialization (FIG. 3) or during runtime (FIG. 4) the user can change the warning limit (Block 310). Any changes to the warning limit cause the method 300 to return to Block 302. For instance, if a user sees a change in their data plan (e.g., an increase in allowable data usage), then the user may change the warning limits for one or more communication data channels and this change will be received as a warning limit changed indicator (Block 310).

If at any time during initialization (FIG. 3) or during runtime (FIG. 4) the communication channel link speed changes, then the method 300 may receive an indication of this (Block 326). Further, this enables changes to affected communication data channels without changes to non-affected communication data channels. Any changes to the communication channel link speed causes the method 300 to return to the timer, buffer threshold, and minimum window set for all communication channels decision (Decision 314).

If at any time during initialization (FIG. 3) or during runtime (FIG. 4) a runtime event triggers a change in the minimum window (Block 318) or the buffer threshold (Block 320), the method 300 or 400 returns to FIG. 3, adjustments to either or both of these are made, and the timer and buffer are restarted (Blocks 322 and 324). The method 300 makes calls to functions for each of Blocks 318 and 320 and then returns to FIG. 4.

The order of Blocks in FIG. 3 can be altered by those of skill in the art without departing from the scope and intent of this disclosure. For instance, Blocks 306 and 308 can be arranged, as can Blocks 322 and 324. Blocks 318 and 320 can occur at the same time, in an overlapping fashion, or sequentially. Further, any of the above Blocks can occur in a simultaneous or overlapping manner Block 324 is independent of Blocks 318, 320, and 322 and thus can be interspersed anywhere between or before or after these blocks. Block 322 can precede Block 318. Block 320 typically occurs before Block 322, although this is not required since Blocks 318 and 320 are independent of each other. Blocks 322 and 324 start at the same time.

Registering the buffer means to make an API call that both registers the buffer threshold with the kernel and starts a counting of data usage and comparing to the buffer threshold.

FIG. 4 illustrates a runtime portion of the method of controlling stats collection that was initially shown in FIG. 3. Runtime begins with the waiting for triggering events from FIG. 3, and either a buffer notification (Block 402) or an expiring of the timer (Block 404) can start the portion of the method shown in FIG. 4. If either trigger occurs (Block 402 or 404), then the method 300 cancels the timer and stores a current value for the timer (only applicable if the buffer notification (Block 402) is received) that can be used later to resume the timer from the same point (Block 406). The buffer is only cancelled when the buffer notification 402 is received. When the timer expires 404, data usage continues to be tracked and compared to the buffer threshold. One result of this is that at Decision 434 (to be discussed below), if the buffer threshold was the trigger (Block 404), then Decision 434 will always result in "yes." Said another way, the path including Blocks 440, 442, and 444 is only followed when the trigger is the timer expiration (Block 404). The method 300 then determines whether the warning limit has been reached and if it is even valid (or has been set) (Decision 408). Since stats have yet to be collected, comparison to the warning limit is made via knowledge of the data usage implied via either the buffer filling or the timer expiring. For instance, if the buffer notification (Block 402)

is received, the method 300 knows how much data has been used since a last stats collection since this value is equal to the buffer threshold. If the total of all previous data used plus the buffer threshold is greater than the warning limit, then Decision 408 determines that the warning limit has been reached. Similarly, if the timer expires (Block 404), then the method 300 knows that the buffer threshold was not met yet, and since the buffer threshold is always selected so that meeting or exceeding the buffer threshold will not lead to overall data usage above the warning limit, the method 300 knows that the warning limit has not been reached.

If the warning limit is reached (Decision 408), and if the minimum window is still in force, then the method 300 can cancel the minimum window (Block 410). Whether the minimum window needs to be cancelled or was previously cancelled, the method 300 then can collect stats (Block 412) and generate a data usage warning (Block 414). If there is only a single warning limit, then the method 300 then resets the timer, buffer, minimum window, and returns to the initialization (FIG. 3) via Block 328 and begins to get communication channel link speeds and set the timer, buffer threshold, and minimum window. If there is a second or more warning limits, then the method 300 resets the timer, buffer, minimum window, and returns to the initialization (FIG. 3) via optional block 310 and begins to reset warning limits.

Figure 16:
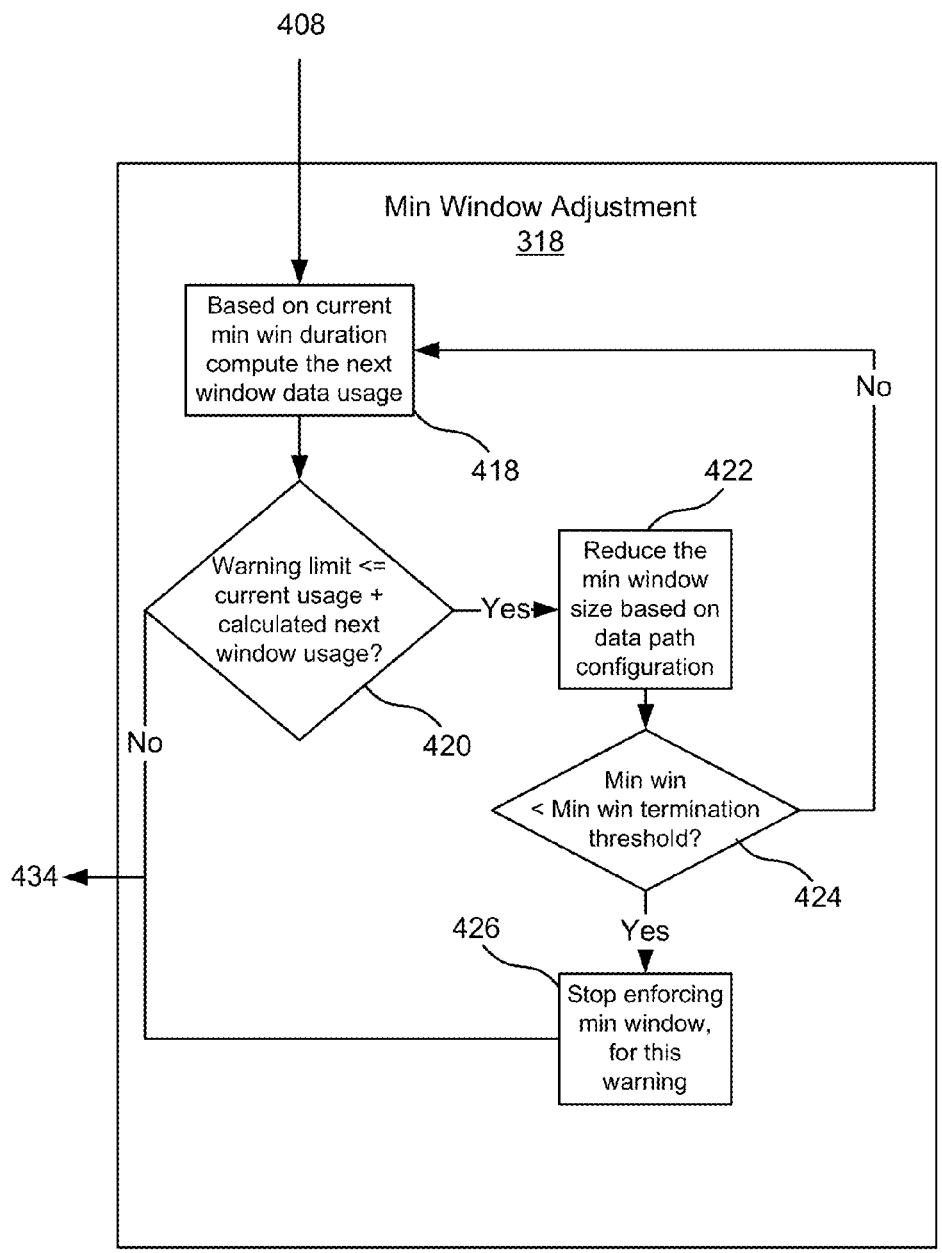
FIG. 16 illustrates one embodiment of details of a minimum window adjustment function.
Figure 17:
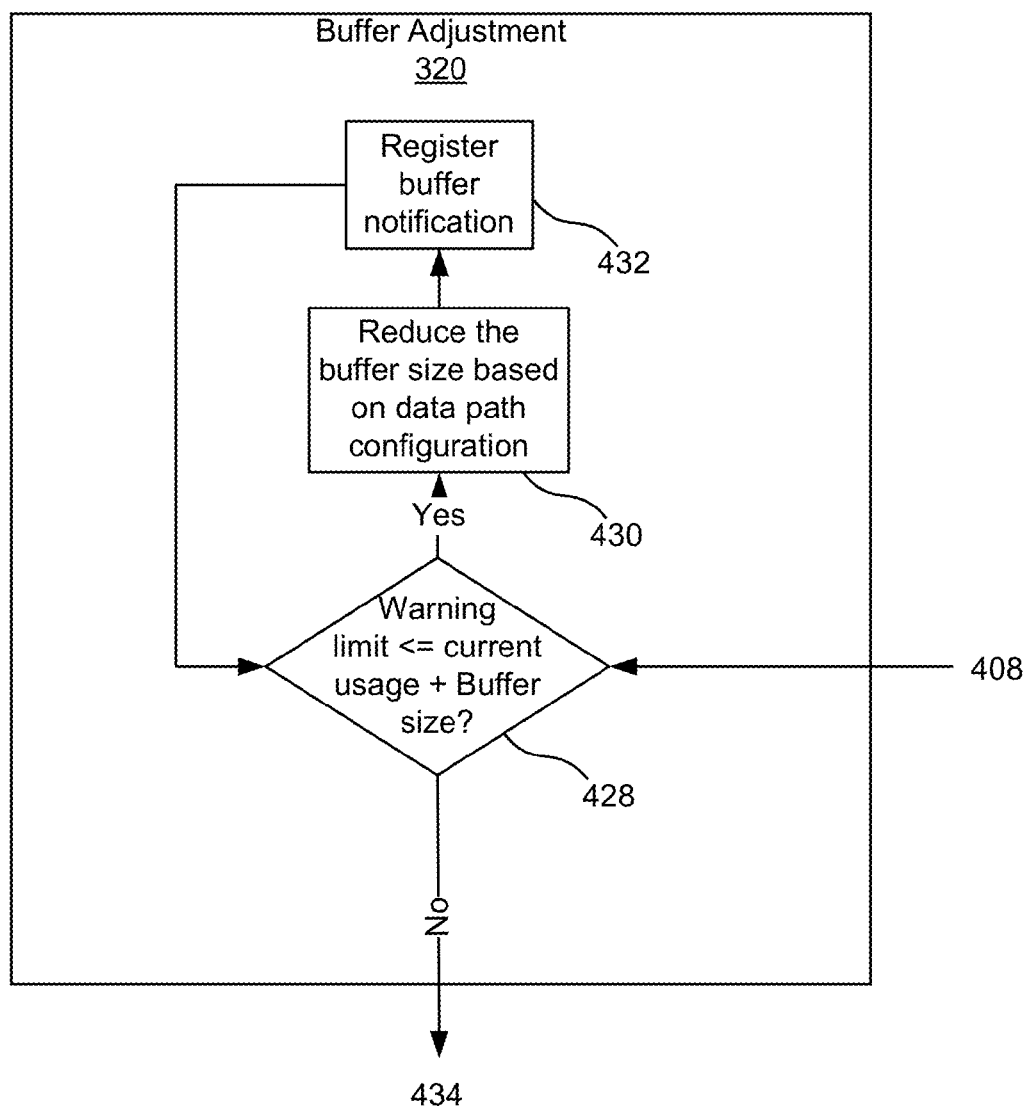
FIG. 17 illustrates on embodiment of details of a buffer adjustment function.

If the warning limit is not reached (Decision 408), then the method 300 calls a minimum window adjustment function (Block 318; see FIG. 16) and a buffer adjustment function (Block 320; see FIG. 17). The minimum window adjustment function (Block 318) adjusts the minimum window size if the data usage has reached a minimum window termination threshold (e.g., see FIG. 11) and/or as the data usage approaches the warning threshold (e.g., see FIG. 8). In one embodiment, FIG. 16 provides further details of the minimum window adjustment function. The buffer adjustment function (Block 320) adjusts the buffer size if the data usage is approaching the warning limit.

The particulars of the minimum window adjustment function (Block 318) can be seen in FIG. 16. In particular, when the method 300 calls this minimum window adjustment function (Block 318), a next minimum window data usage can be estimated based on the current minimum window duration (Block 418). In other words, the duration of the minimum window can be multiplied by the communication data channel speed to give a maximum data usage that might occur in the next minimum window. If this value, when added to all previous data usage, is equal to or greater than the warning limit (Decision 420), then the function reduces the minimum window size (Block 422) and then Block 318 calls Block 422. In an embodiment, this reduction in the minimum window can be based on the communication link speed. Once the adjustment has taken place, a comparison of the minimum window to a minimum window termination threshold can be made (Decision 424). If the minimum window is smaller than the minimum window termination threshold (e.g., the data usage has approached the warning limit), then the function cancels the minimum window for the warning limit (Block 426). Where other warning limits for the communication channel exist, the minimum window may be reinstated. However, where only a single warning limit exists, this cancellation may indicate an end of the minimum window for the method 300. If the minimum window is equal to or greater than the minimum window termination threshold (Decision 424), the function can return to an estimation of data usage during a next minimum window (Block 418). Since the minimum window has been reduced, Block 418 is likely to generate an estimate that does not meet or exceed the warning limit (Decision 420), and the function can proceed without further reduction in the minimum window. However, in some cases, multiple reductions in the minimum window may be needed before the minimum window can be reinstated. In some instance, the reduction in the minimum window (Block 422) can include reducing the minimum window by half, while in other instances, other reductions can be used (e.g., constant reductions, dynamic reductions, exponential reductions, although it may also be optimized for a given network technology and device chipset).

The particulars of the buffer adjustment function (Block 320) can be seen in FIG. 17. In particular, when the method 300 calls this buffer adjustment function (Block 320), the warning limit can be compared to cumulative data usage added to a size of the buffer threshold (Decision 428), and as long as this sum is less than the warning limit, the function does not adjust the buffer threshold. In other embodiments, algorithms or equations other than a sum function can be used. For instance, the current usage and buffer threshold could be compared to a delta value or a dynamic increase or decrease in a value such that the algorithm or equation can be applied across different systems. In another example, the data usage can be used in an equation or algorithm other than a mere sum with the buffer threshold size. In some instances, other values can be added to the data usage and buffer threshold and compared to the warning limit. However, if the data usage plus a size of the buffer threshold is equal to or greater than the warning limit (Decision 428), then the function reduces the buffer threshold based on the communication channel link speed (Block 430). The reduction (Block 430) can direct the method 300 to the buffer adjustment function (Block 320) in FIG. 3. The adjusted buffer is registered and begins tracking data usage (Block 432), and the buffer adjustment function (Block 320) can again compare the current usage added to the reduced buffer threshold, to the warning limit. If the warning limit is still equaled or exceeded, then further buffer threshold reduction may be in order. However, if the reduction was sufficient to ensure that data usage to meet the next buffer threshold will not lead to the warning limit being reached (Decision 428), then the buffer adjustment function (Block 320) can exit and return to a determination as to whether the minimum window is being enforced (Decision 434). It should be noted that Blocks 320 and 318 are illustrated in parallel because they are independent of each other.

The minimum window can be considered enforced within any of multiple minimum windows, and between those minimum windows the minimum window is not being enforced. Expiration of the minimum window leads to disarming of the minimum window (Block 448), and the period following this until the minimum window is rearmed (Block 444) can be considered a period of non-enforcement of the minimum window. This means that stats can be collected while the minimum window is not enforced.

If the minimum window is not being enforced (Decision 434), then the method 300 can collect stats (Block 440), restart the timer (Block 442), and begin enforcing the minimum window again (Block 444). If the minimum window is still being enforced (Decision 434), then the method 300 can resume the timer from the stored timer value (Block 436) that was stored in Block 406.

Once the timer has been resumed (Block 436), or the timer has been restarted (Block 442) and the minimum window is resumed (Block 444), then the method 300 begins waiting for a timer or buffer threshold event again (Block 438).

FIG. 4 illustrates one exemplary order of operations, but those of skill in the art can reorder the visualized steps without departing from the scope and intent of the disclosure. For instance, Blocks 410, 412, and 414 can be reordered. Blocks 442 and 444 can be reordered. Block 446 always occurs between Block 438 and Block 416 or between Block 438 and Block 404. In other words, the minimum window only expires after the wait for event Block and before either of the trigger Blocks 402 and 404.

FIGS. 5-10 illustrate timing charts for the buffer threshold, timer, communication channel link speed, minimum window, stats collection, and data usage under a variety of different situations. In each plot, the x-axis represents time. In each of these charts, one will notice that the timer typically takes longer to expire than the minimum window. Also, while the timer typically takes longer to expire than it takes data usage to meet the buffer threshold, in certain circumstances the buffer threshold can take longer to be met than the timer expiration. The buffer threshold is not illustrated in these timing charts, but rather a time that it takes the buffer threshold to be met. Thus, the size of the pulses in the buffer timelines is a function both of a rate of data usage and the value of the buffer threshold. One will also notice that stats collection only occurs between minimum windows and only occurs after either an instance of the buffer threshold being met or the timer expiring. Typically, the minimum window resumes or is enforced after an instance of stats collection. Additionally, the timer restarts every time that stats are collected. This means that the length of the timer may appear shorter than it really is in many of the timing charts since the timer is restarting before it expires.

Figure 5:
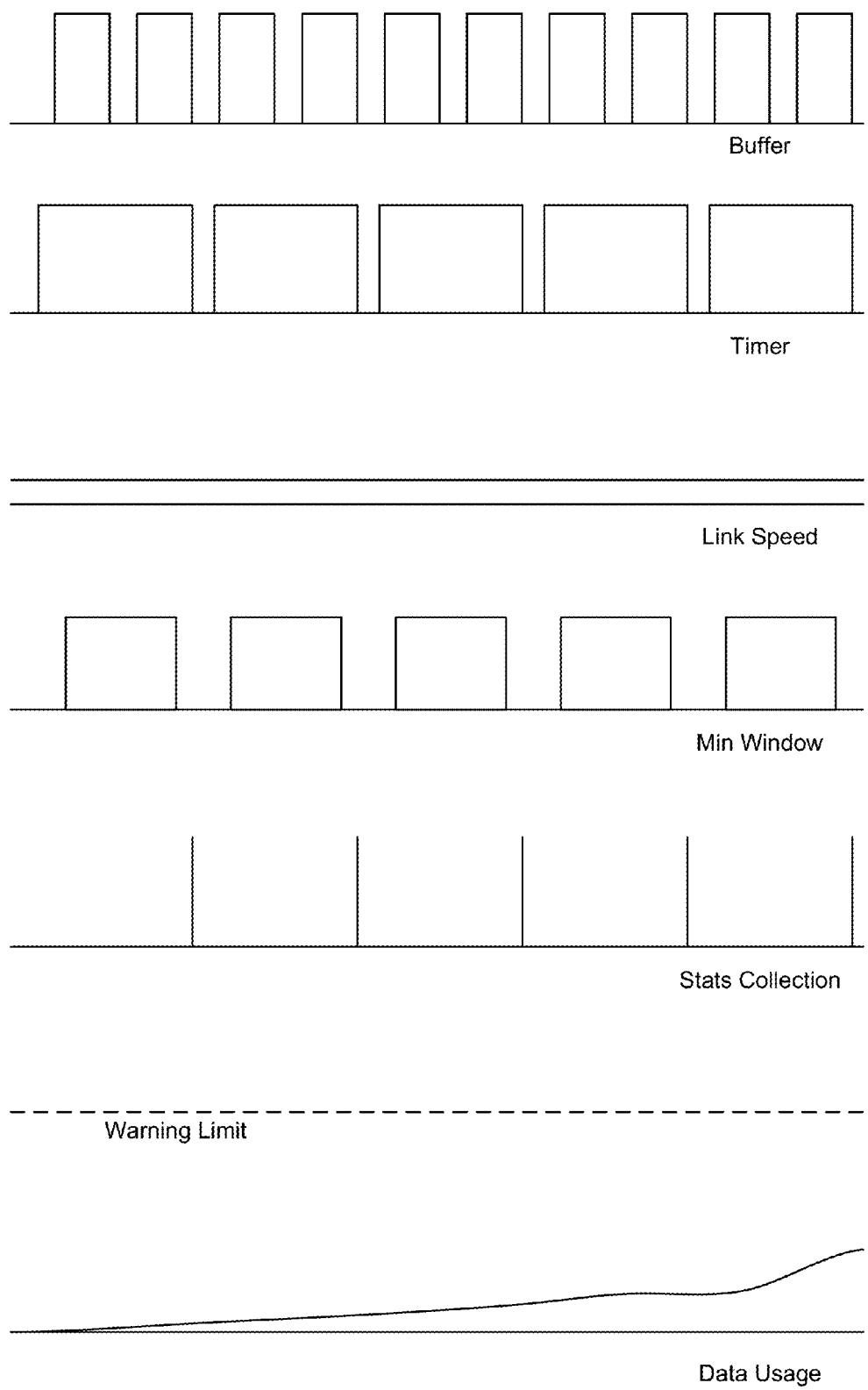
FIG. 5 illustrates all of these timing charts for a typical situation where communication channel link speed does not change.

FIG. 5 illustrates all of these timing charts for a typical situation where communication channel link speed does not change. The stats collection, triggered by either meeting of the buffer threshold or an expiration of the timer and after expiration of an instance of the minimum window (when the minimum window is not being enforce; between minimum windows), occurs five times during this plot. In this instance, the data usage is such that the buffer threshold is met at a faster rate than an expiration of the timer. This examples shows typical operation of the minimum window when the data usage is far from the warning limit.

This example chart is not necessarily drawn to scale. For instance, in practice, the timer may expire every 30 minutes (e.g., on the order of tens of minutes), whereas the buffer threshold may be met in a matter of seconds. Further, the minimum window may be on the order of seconds. However, these are just examples, and implementation may involve different values for each.

Figure 6:
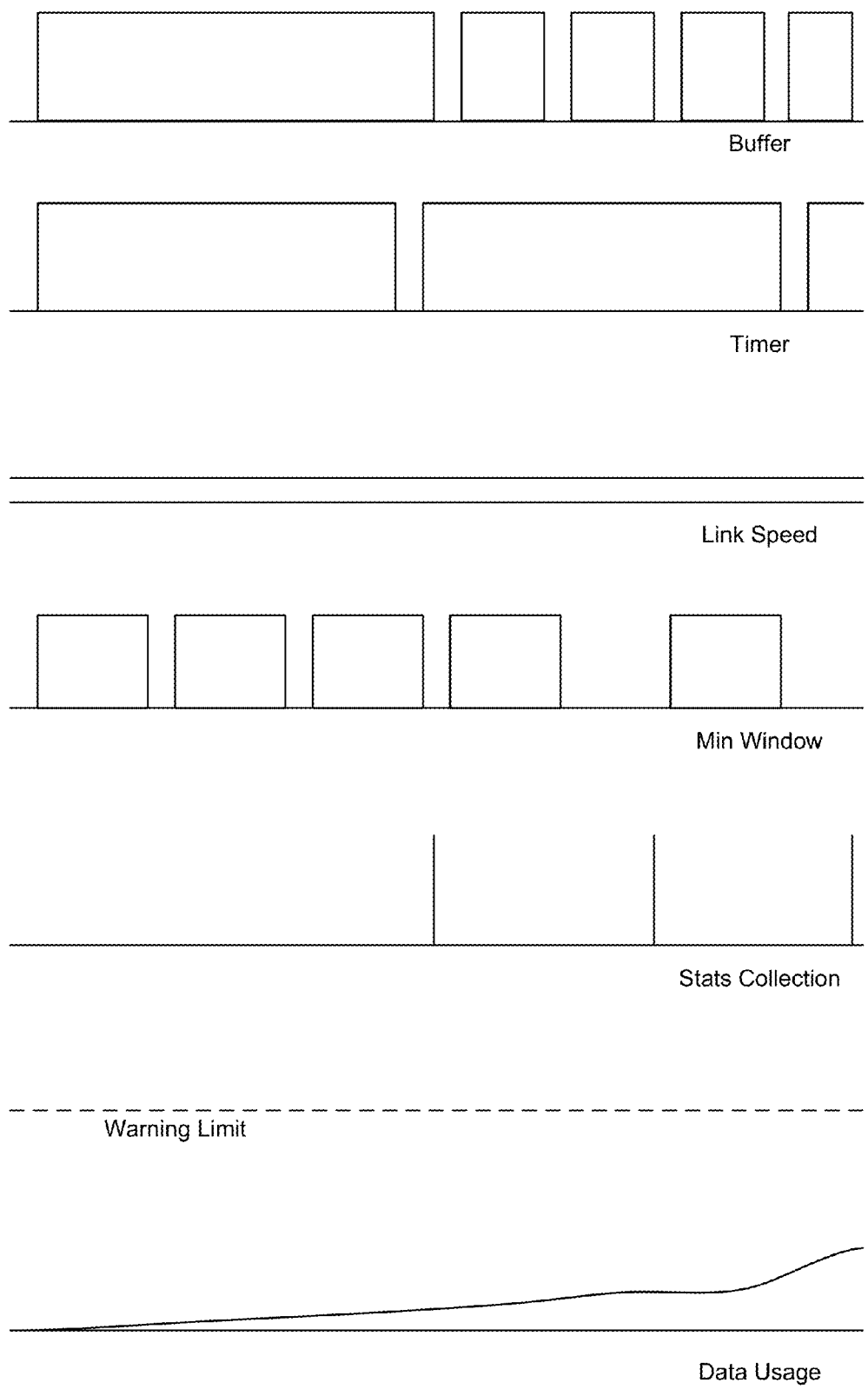
FIG. 6 illustrates another timing chart for a typical situation where the link speed does not change, but in this instance, the data usage changes.
Figure 7:
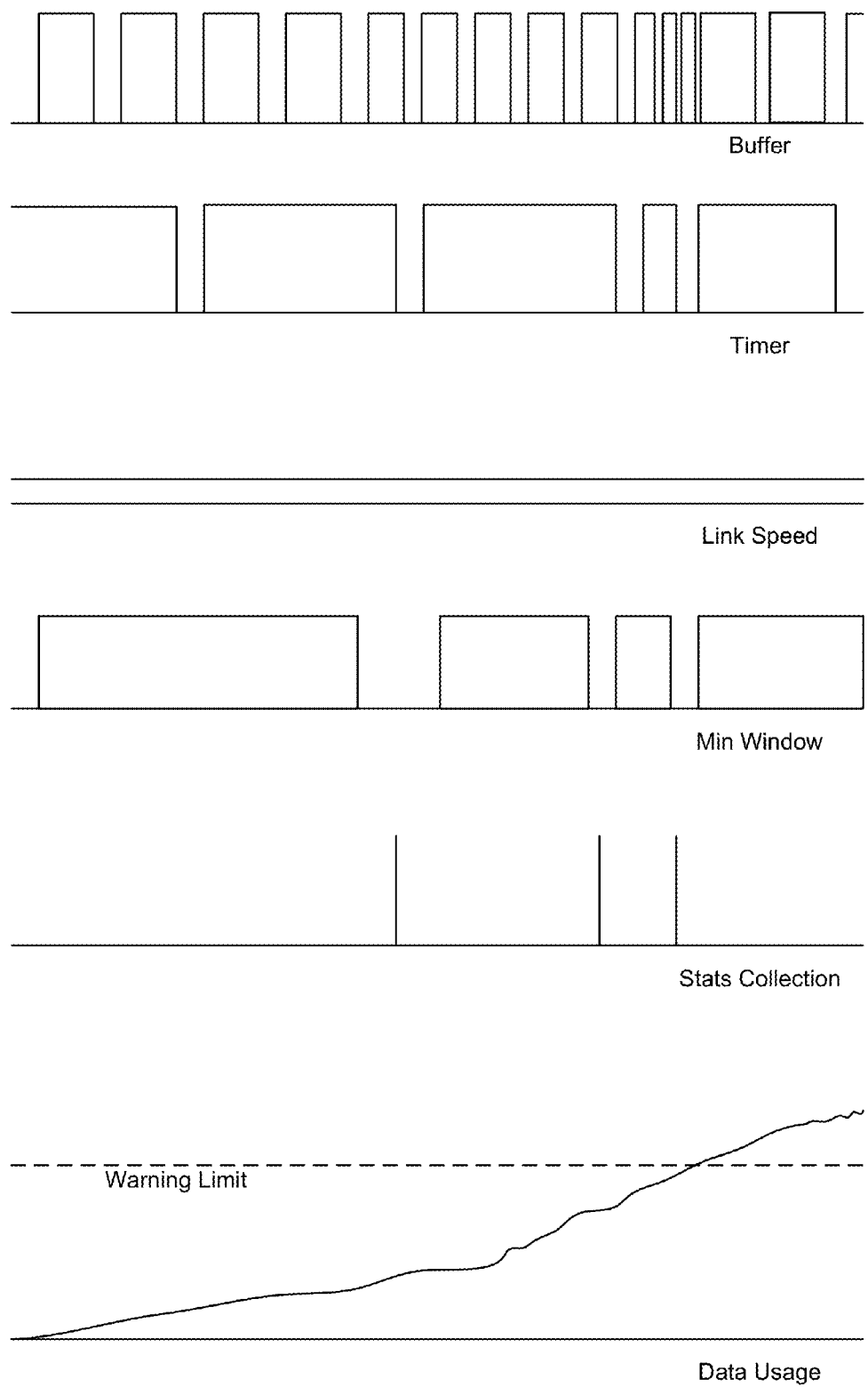
FIG. 7 illustrates a minimum window and buffer threshold being reduced as the data usage approaches the warning limit.

FIG. 6 illustrates another timing chart for situation where the rate of data usage changes, even though the link speed remains constant. This is seen in the change in the length of time that it takes the buffer threshold to be met. Early in the chart, data usage is low and the buffer threshold takes longer than the timer expiration to be met. Yet, after the first instance of stats collection, the data usage rate apparently increases since the buffer threshold begins being met much quicker than the timer expiration period. One notices that this is not the result of a change in link speed since link speed stays the same. One also notices that the second stats collection does not occur immediately after the end of the fourth minimum window. Rather, some time elapses before either the buffer threshold being met or expiration of the timer triggers stats collection. Once stats collection takes place, the minimum window is again resumed or enforced. In other words, when the minimum window is not enforced, the system waits until a stats collection is triggered before resuming the minimum window. As in FIG. 5, this example assumes that the data usage is far from the warning limit. FIG. 7 illustrates one example of a timing chart when the data usage approaches and exceeds the warning limit.

FIG. 7 illustrates a minimum window and buffer threshold being reduced as the data usage approaches the warning limit. Here the minimum window is largest when the data usage is well below or far from the warning limit and decreases as the data usage approaches the warning limit (recall Block 422 in FIG. 4). Similarly, the buffer threshold decreases as the data usage approaches the warning limit (visible as a reduction in the time taken to meet the buffer threshold). Each of the minimum window and the buffer threshold can decrease by a factor of 2, 3, 4, exponentially, or via any other algorithm known to those of skill in the art. Once the warning limit is reached, the minimum window, timer, and buffer threshold are all reset to default values or based on a path configuration for the system.

Figure 8:
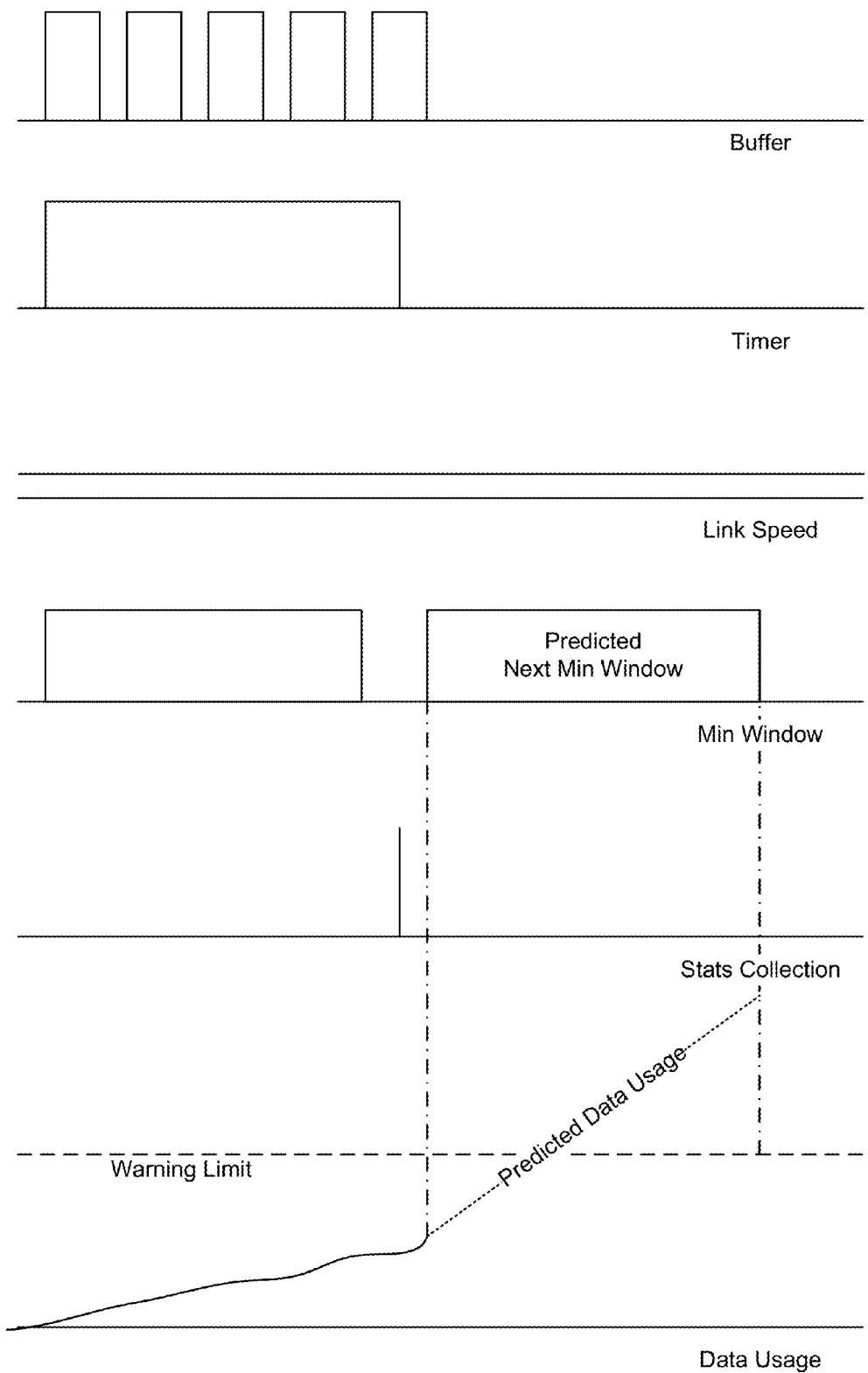
FIG. 8 illustrates how the timing of the minimum window reduction is determined.
Figure 9:
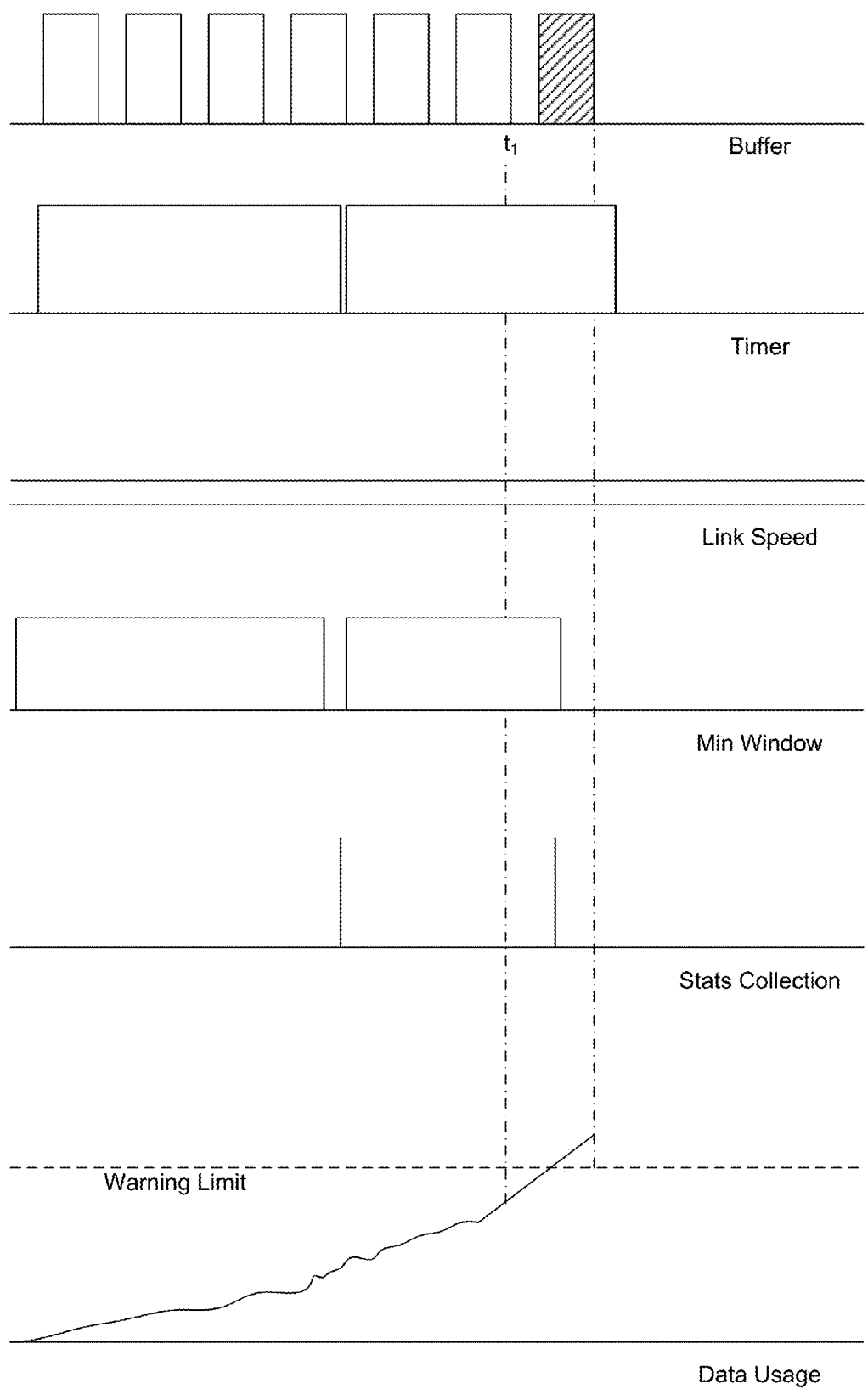

FIG. 8 provides more detail as to how the minimum window is reduced while FIG. 9 provides more detail as to how the buffer threshold is reduced.

The relative time that it takes the buffer threshold to be met, the timer to expire, and the minimum window to expire are not necessarily drawn to scale, and in practice, the timer will often be much longer than the minimum window.

FIG. 8 illustrates how a reduction of the minimum window is determined. After the first illustrated minimum window, an instance of stats collection occurs (triggered by an end of the timer). At relatively the same time, a predicted data usage during a next minimum window can be predicted (recall Block 418 in FIG. 4), and compared to the warning limit (recall Block 420 in FIG. 4). In this case the predicted data usage exceeds the warning limit. In such a case, the minimum window can be reduced (not shown; recall Block 422 in FIG. 4), and this prediction can be performed again to ensure that the maximum data usage during the next minimum window will not exceed the warning limit. The purpose of such prediction and minimum window reduction (e.g., Blocks 418, 420, 422) is to attempt to ensure that stats are collected prior to exceeding the warning limit. In some cases it may take multiple reductions before the minimum window can be resumed, while in other cases only a single reduction may take place.

FIG. 9 illustrates how the timing of the buffer threshold reduction is determined. In particular, the buffer threshold can be met at ti, at which point an estimate of the maximum data usage that may occur en route to meeting a next buffer threshold (e.g., see cross hatched buffer threshold rectangle) can be performed. If this estimated data usage, when added to all previous data usage, is below the warning limit, then no change to the buffer threshold occurs (recall Block 428 in FIG. 4). However, if the estimated data usage, when added to all previous data usage, is equal to or exceeds the warning limit (as illustrated) (recall Block 428 in FIG. 4), then the buffer threshold can be reduced (the reduced buffer thresholds are not illustrated) (recall Block 430 in FIG. 4).

Figure 10:
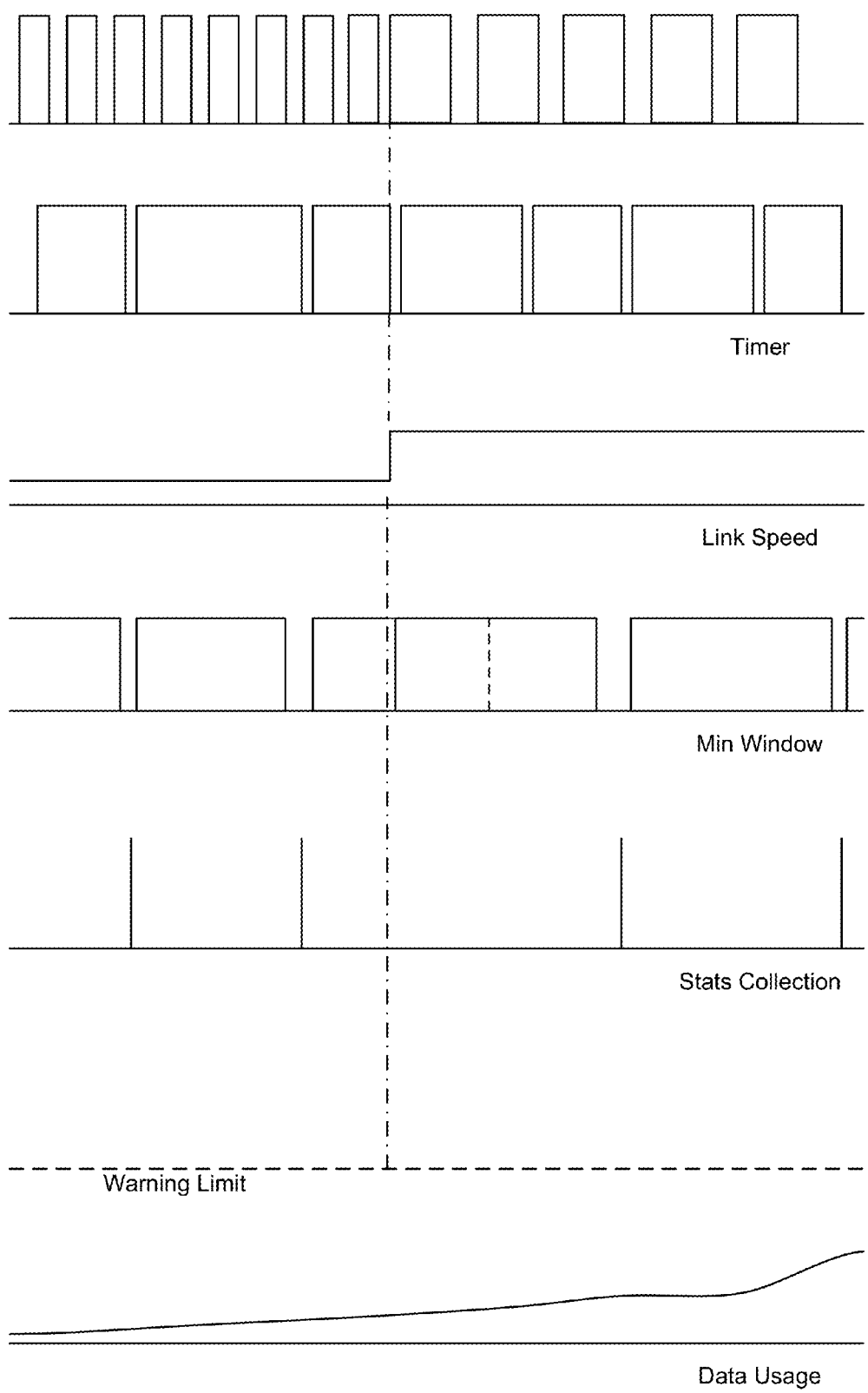
FIG. 10 illustrates adjustment to the buffer threshold, timer, and minimum window in response to a change in the communication channel link speed.

FIG. 10 illustrates adjustment to the buffer threshold, timer, and minimum window in response to a change in the communication channel link speed. When the communication channel link speed change occurs (from a first to a second speed, where the second speed is greater than the first), the buffer threshold, timer, and minimum window are all reset based on the second communication channel link speed and restarted. This reset includes accounting for the change in data usage that may result from increased or decreased throughput. As illustrated, the communication channel link speed increases from a first value to a second value, and as a result the size of the buffer threshold, and minimum window can be increased, while a size of the timer decreases (e.g., to maintain precision of identifying the warning limit). The adjusted minimum window even restarts prior to a time when the interrupted minimum window would have completed as shown via dashed lines. The illustrated timing assumes that the data usage is far from the warning limit, and hence the buffer threshold and minimum window are not adjusted as a function of data usage proximity to the warning limit.

Figure 11:
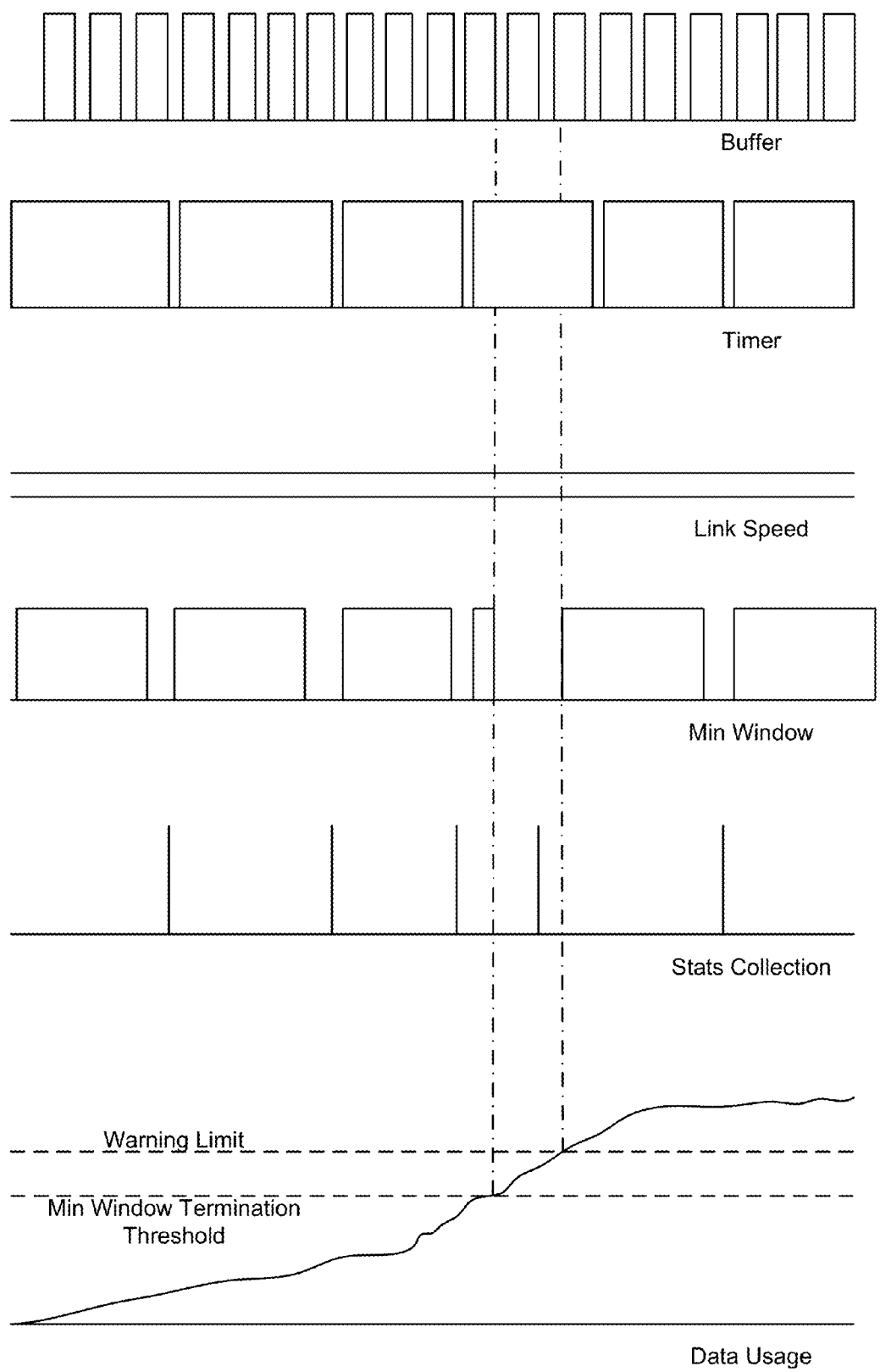
FIG. 11 illustrates a situation where the minimum window is cancelled once the data usage comes within a minimum window termination threshold.

FIG. 11 illustrates a situation where the minimum window is cancelled once the data usage comes within a minimum window termination threshold. In particular, once the data usage meets the minimum window termination threshold, the second illustrated minimum window is cancelled midstream, and stats collection begins without suppression thereafter (e.g., at each expiration of the timer and each instance of the buffer threshold being met). In a non-illustrated embodiment, the minimum window termination threshold can be a time. For instance, a time at which the data usage is expected to reach the warning limit can be used to extrapolate a time when the minimum window should be cancelled, thereby allowing more frequent stats collection close to the warning limit.

Figure 12:
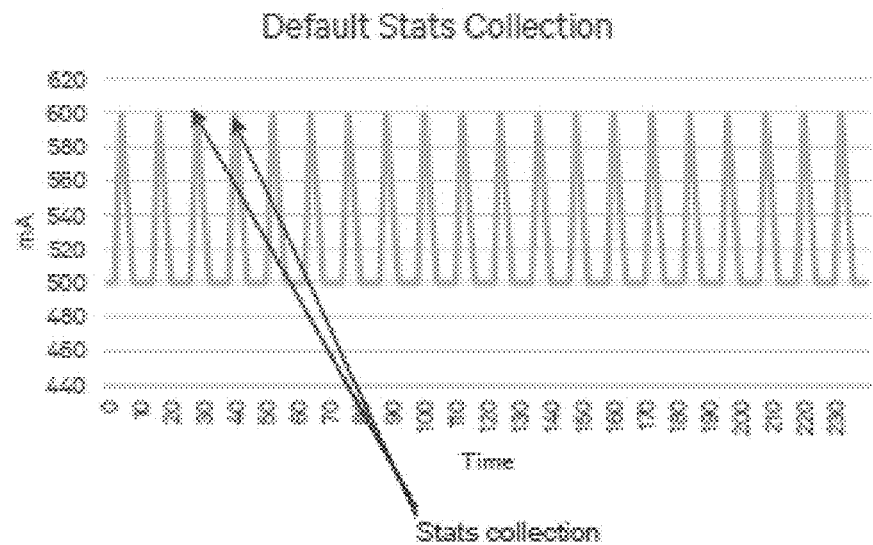
FIG. 12 illustrates two plots of processor current consumption as a function of time showing the prior art stats collection versus the herein disclosed stats collection.
Figure 12:
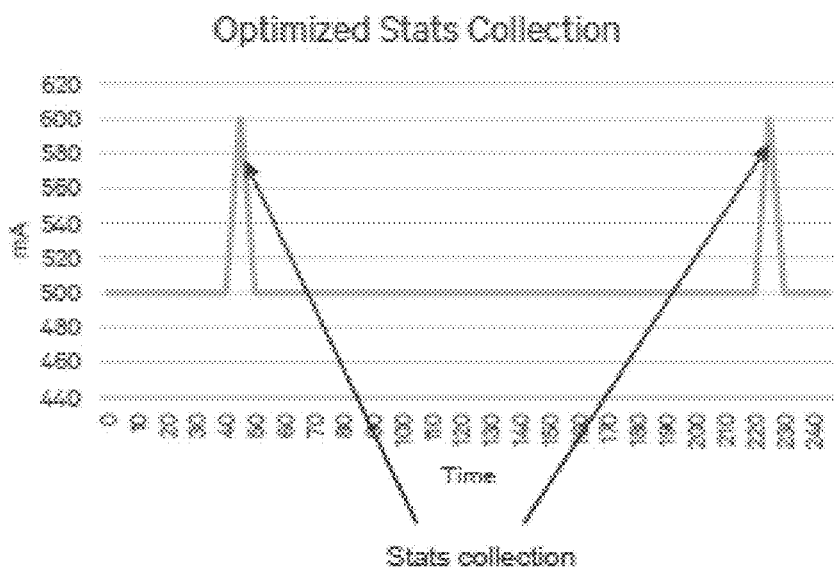

FIG. 12 illustrates two plots of processor current consumption as a function of time showing the prior art stats collection versus the herein disclosed stats collection. The herein disclosed suppression of stats collection greatly reduces power consumption over the prior art.

Figure 13:
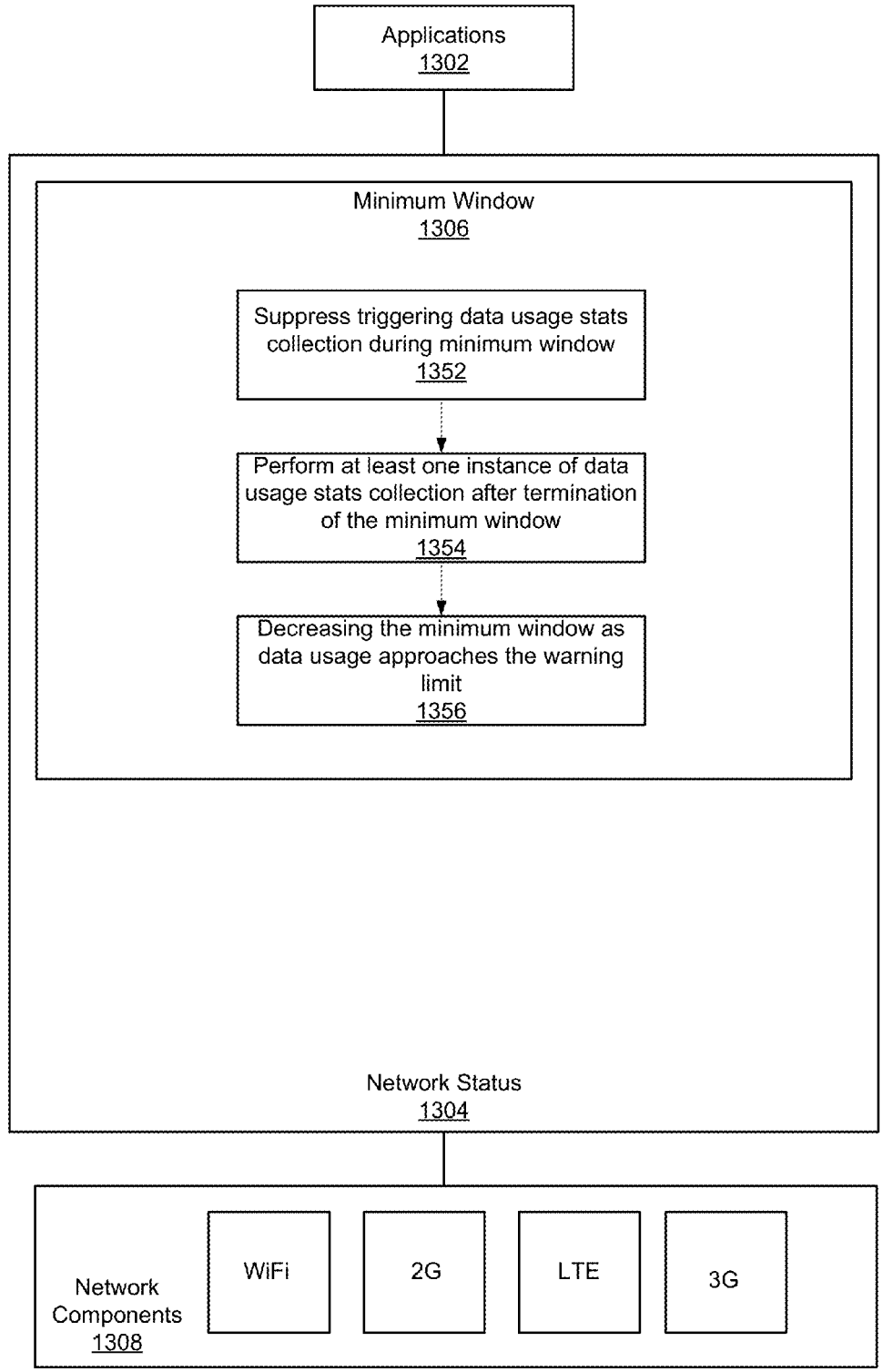
FIG. 13 illustrates a block diagram depicting physical components that may be utilized to realize the minimum window module.

Referring to FIG. 13, shown are components of an exemplary computing device. As shown the computing device may include one or more applications 1302 at a highest level of abstraction and one or more network-related communication components 1308 (e.g., WiFi, Bluetooth, LTE, and 3G-cellular) at a hardware level. Also shown between the applications 1302 and the network components 1308 are a network status module 1304 that includes a minimum window module 1306.

The applications 1302 may include any of a variety of application that utilize one of the network components 1308 to send and receive data. For example, the applications 1302 may include gaming applications, a web browser, a weather-related application, stock-tracking application etc. The network status module 1304 in this embodiment may be realized my modifying an existing network status component in prior versions of the ANDROID framework to include the minimum window module 1306. And although not depicted, one of ordinary skill in the art will appreciate that the computing device may include several other components such as additional hardware, devices drivers, etc.

The applications 1302 may rely upon network stats about data usage to provide details about actual usage and a warning about excessive usage or usage that exceeds a threshold (e.g., to a user). In the depicted embodiment, the minimum window module 1306 may be used to define a minimum window per data rate/protocol during which stats collections is suppressed. In an embodiment, the buffer threshold can depend on the communication channel link speed. For example, 3G and LTE communication channels may each have a different buffer threshold for triggering stats collection. In an embodiment, the faster the communication channel, the larger the buffer threshold. Similarly, the timer can be decreased for higher throughput communication channels.

Figure 14:
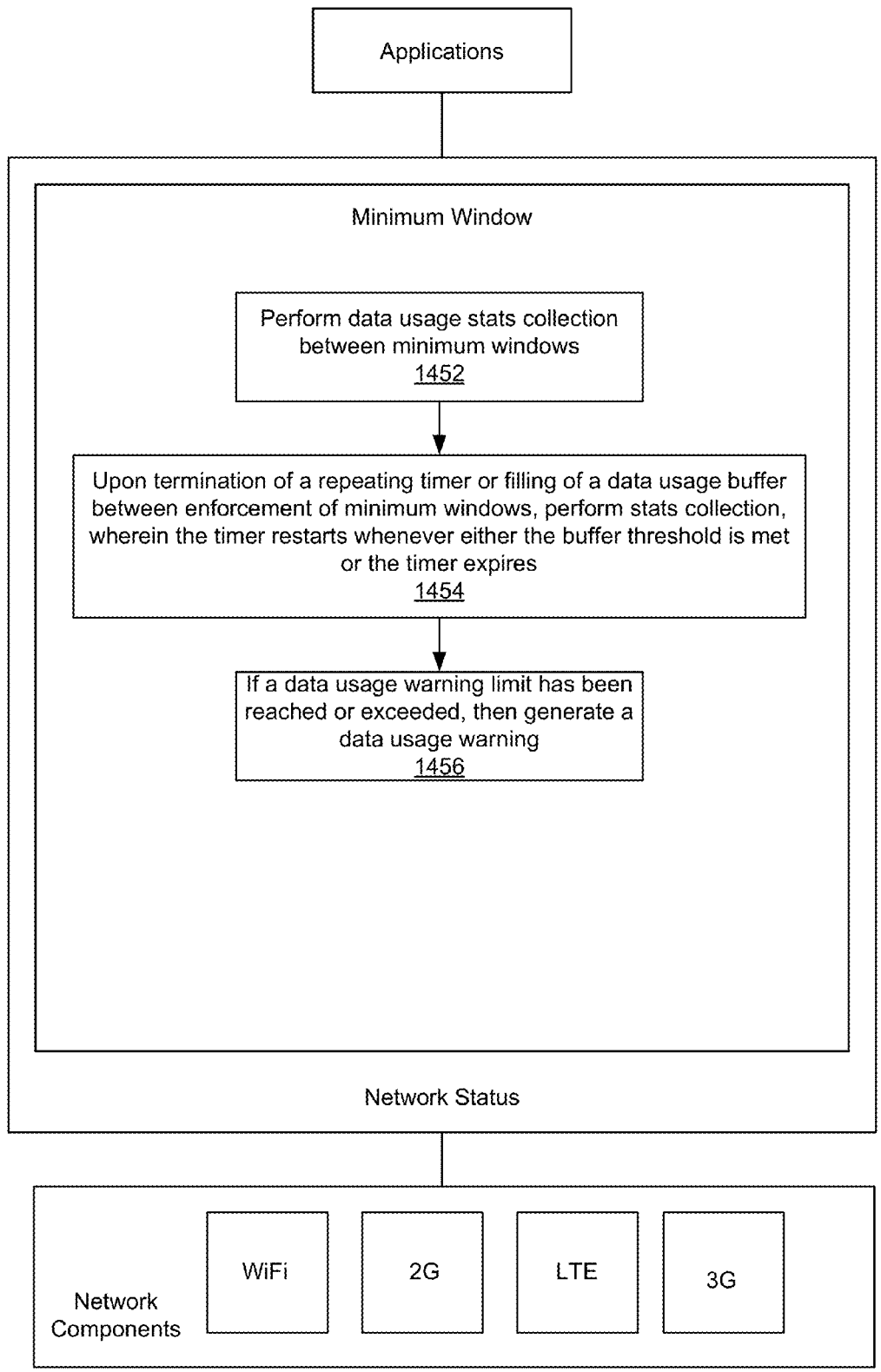
FIG. 14 illustrates a block diagram depicting physical components that may be utilized to realize the minimum window module.

FIG. 14 shown is a block diagram depicting physical components that may be utilized to realize the minimum window module. The components of FIG. 14 are the same as those of FIG. 13, and thus identical components are not numbered. However, here, the minimum window module includes the following functions: perform data usage stats collection between minimum windows (Block 1452); upon termination of a repeating timer or filling of a data usage buffer between enforcement of minimum windows, perform stats collection, wherein the timer restarts whenever either the buffer threshold is met or the timer expires (Block 1454); and if a data usage warning limit has been reached or exceeded, then generate a data usage warning (Block 1456).

Figure 15:
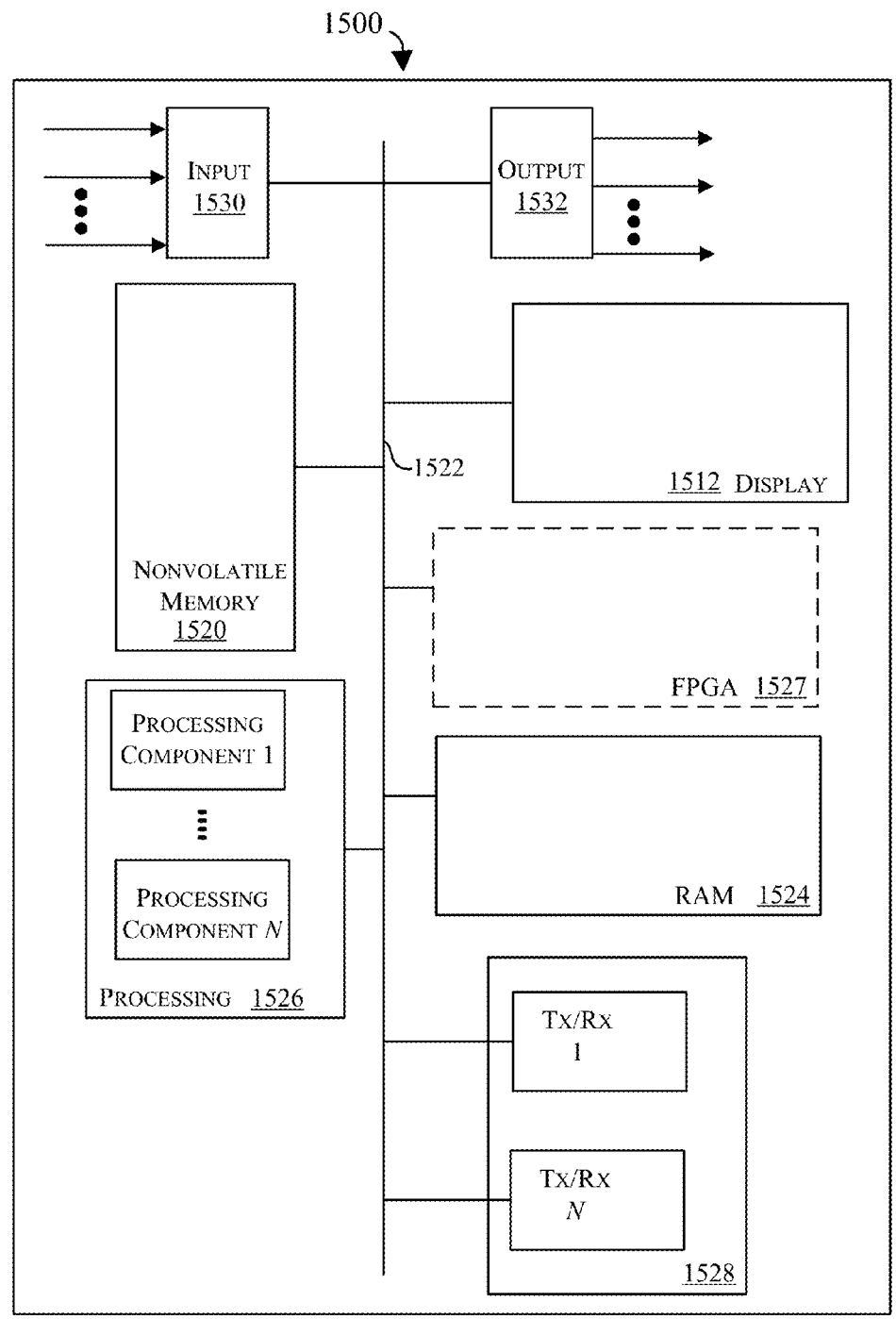
FIG. 15 illustrates a block diagram depicting physical components that may be utilized to realize the minimum window module.

The methods described in connection with the embodiments disclosed herein may be embodied directly in hardware, in processor-executable code encoded in a non-transitory tangible processor readable storage medium, or in a combination of the two. Referring to FIG. 15 for example, shown is a block diagram depicting physical components that may be utilized to realize the minimum window module 1306 (and the network status component 1304 generally) according to an exemplary embodiment. As shown, in this embodiment a display portion 1512 and nonvolatile memory 1520 are coupled to a bus 1522 that is also coupled to random access memory ("RAM") 1524, a processing portion (which includes N processing components) 1526, an optional field programmable gate array (FPGA) 1527, and a transceiver component 1528 that includes N transceivers. Although the components depicted in FIG. 15 represent physical components, FIG. 15 is not intended to be a detailed hardware diagram; thus many of the components depicted in FIG. 15 may be realized by common constructs or distributed among additional physical components. Moreover, it is contemplated that other existing and yet-to-be developed physical components and architectures may be utilized to implement the functional components described with reference to FIG. 15.

This display portion 1512 generally operates to provide a user interface for a user, and in several implementations, the display is realized by a touchscreen display. In general, the nonvolatile memory 1520 is non-transitory memory that functions to store (e.g., persistently store) data and processor-executable code (including executable code that is associated with effectuating the methods described herein). In some embodiments for example, the nonvolatile memory 1520 includes bootloader code, operating system code, file system code, and non-transitory processor-executable code to facilitate the execution of methods described with reference to FIGS. 2-4 described further herein.

In many implementations, the nonvolatile memory 1520 is realized by flash memory (e.g., NAND or ONENAND memory), but it is contemplated that other memory types may be utilized as well. Although it may be possible to execute the code from the nonvolatile memory 1520, the executable code in the nonvolatile memory is typically loaded into RAM 1524 and executed by one or more of the N processing components in the processing portion 1526.

The N processing components in connection with RAM 1524 generally operate to execute the instructions stored in nonvolatile memory 1520 to enable less-power-hungry stats collection. For example, non-transitory, processor-executable code to effectuate the methods described with reference to FIGS. 2-4 may be persistently stored in nonvolatile memory 1520 and executed by the N processing components in connection with RAM 1524. As one of ordinarily skill in the art will appreciate, the processing portion 1526 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1526 may be configured to effectuate one or more aspects of the methodologies described herein (e.g., the methods described with reference to FIGS. 2-4). For example, non-transitory processor-readable instructions may be stored in the nonvolatile memory 1520 or in RAM 1524 and when executed on the processing portion 1526, cause the processing portion 1526 to monitor a warning limit and link speed, and adjust a buffer threshold and minimum window size based on these, among other adjustments. Alternatively, non-transitory FPGA-configuration-instructions may be persistently stored in nonvolatile memory 1520 and accessed by the processing portion 1526 (e.g., during boot up) to configure the hardware-configurable portions of the processing portion 1526 to effectuate the functions of the minimum window module 1306.

The input component 1530 operates to receive signals (e.g., a link speed indicator) that are indicative of one or more aspects of the communication channel. The output component generally operates to provide one or more analog or digital signals to effectuate an operational aspect of the minimum window module 1306.

The depicted transceiver component 1528 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of controlling data usage statistics in a computing device, comprising:
   suppressing, via a minimum window component of the computing device, triggering data usage stats collection during a minimum window;
   performing, via a network status component of the computing device, at least one instance of data usage stats collection after termination of the minimum window;
   incrementally decreasing, via a minimum window adjustment function of the minimum window component, the minimum window as data usage approaches a warning limit:
   wherein the minimum window is a function of (1) a communications channel link speed, and (2) a proximity of data usage to the warning limit;
   wherein the triggering is caused by either expiration of a timer or data usage that meets a buffer threshold, and wherein a length of the timer and a size of the buffer threshold are based on the communication channel link speed; and
   wherein the buffer threshold is a function of the proximity of the data usage to the warning limit.

2. The method of claim 1, further comprising determining if a predicted data usage during a next instance of the minimum window will create a total data usage that meets the warning limit, and if so, then terminating the suppressing and instead performing all scheduled instances of data usage stats collection until the warning limit is reached, where meets the warning limit can include hitting a threshold short of the warning limit, meeting the warning limit, or exceeding the warning limit.

3. The method of claim 1, further comprising different warning limits for different communication data channels.

4. The method of claim 1, wherein the minimum window adjustment function is dynamic.

5. A system for controlling data usage statistics in network-connected devices comprising:
   a processing portion with one or more processing components therein;
   a memory coupled to the processing portion;
   a minimum window module stored on the memory and executable on the processing portion to:
      perform stats collection between minimum windows;
      upon termination of a repeating timer or meeting of a buffer threshold tracking data usage, and between enforcement of minimum windows, perform stats collection, wherein the timer restarts whenever either the timer expires or the buffer threshold is met;
      if a data usage warning limit has been reached or exceeded, then generate a data usage warning;
      where, the minimum windows are a function of (1) a communication channel link speed, and (2) a proximity of data usage to the warning limit; and
      where the timer and the buffer threshold are a function of the communication channel link speed; and
      wherein the buffer threshold is a function of the proximity of the data usage to the warning limit.

6. The method of claim 5, wherein the minimum window module further comprises a minimum window adjustment function executable on the processing portion to determine if a predicted data usage during a next instance of the minimum window will create a total data usage that meets the warning limit, and if so, then perform all scheduled instances of the stats collection until the warning limit is reached, where meets the warning limit can include hitting a threshold short of the warning limit, meeting the warning limit, or exceeding the warning limit.

7. The method of claim 5, wherein a length of the minimum window is a function of a communications channel link speed that differs for each of the communication data channels.

8. The method of claim 5, wherein the buffer threshold is incrementally reduced as the data usage approaches the data usage warning limit.

9. A non-transitory, tangible processor readable storage medium, encoded with processor executable code to perform a method for controlling data usage statistics in a computing device, the method comprising:
- suppressing triggering data usage stats collection during a minimum window;
- performing at least one instance of data usage stats collection after termination of the minimum window;
- if the data usage stats show that a warning limit has not been met or exceeded, then incrementally decreasing the minimum window as data usage approaches a warning limit:
- wherein the minimum window is a function of (1) a communications channel link speed, and (2) a proximity of data usage to the warning limit;
- wherein the triggering is caused by either expiration of a timer or data usage that meets a buffer threshold, and wherein a length of the timer and a size of the buffer threshold are based on the communication channel link speed; and
- wherein the buffer threshold is a function of the proximity of the data usage to the warning limit.

10. The non-transitory, tangible computer readable storage medium of claim 9, further comprising determining if a predicted data usage during a next instance of the minimum window will create a total data usage that meets the warning limit, and if so, then terminating the suppressing and instead performing all scheduled instances of data usage stats collection until the warning limit is reached, where meets the warning limit can include hitting a threshold short of the warning limit, meeting the warning limit, or exceeding the warning limit.

11. The non-transitory, tangible computer readable storage medium of claim 9, further comprising different warning limits for different communication data channels.

12. The non-transitory, tangible computer readable storage medium of claim 9, wherein the minimum window adjustment function is dynamic.

* * * * *